July 2, 1935. W. E. OAKEY 2,007,001
EXTENDED SURFACE CONVECTOR
Filed March 2, 1934
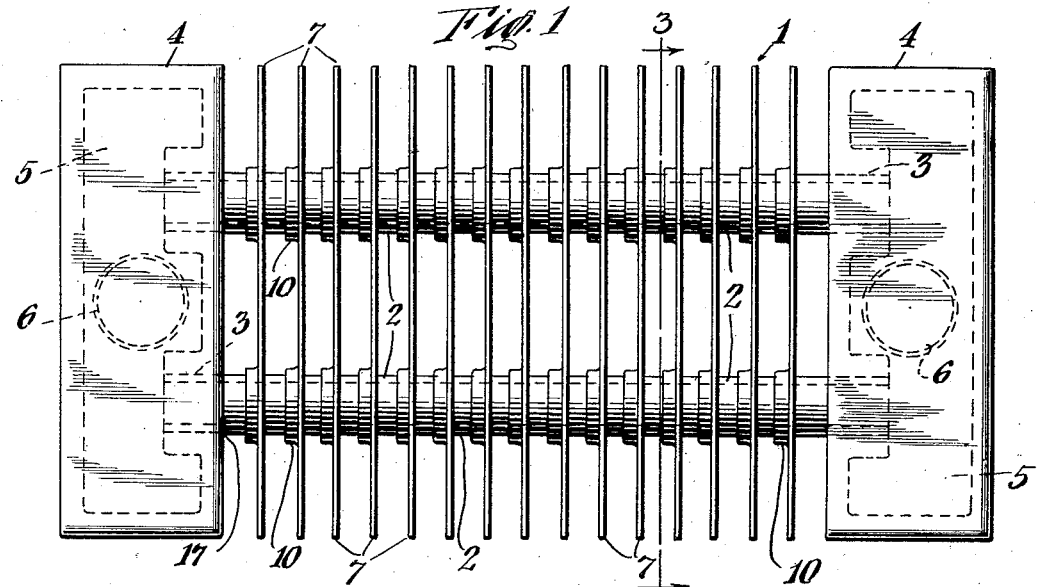
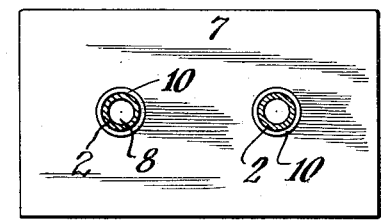
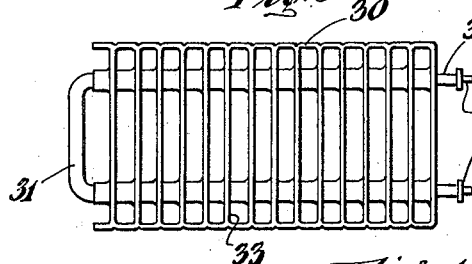
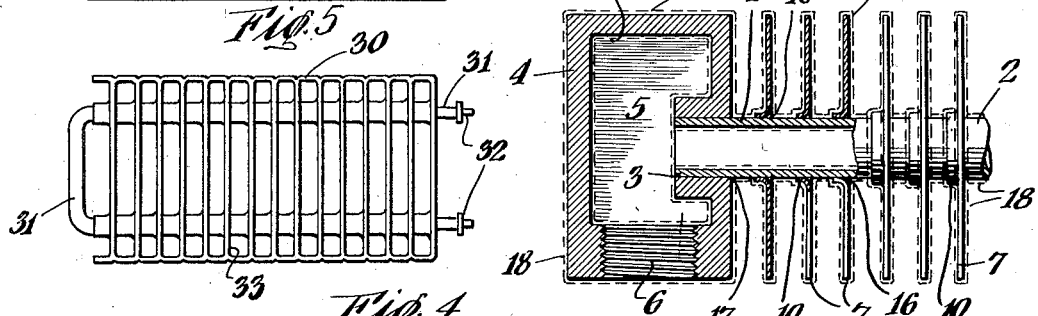
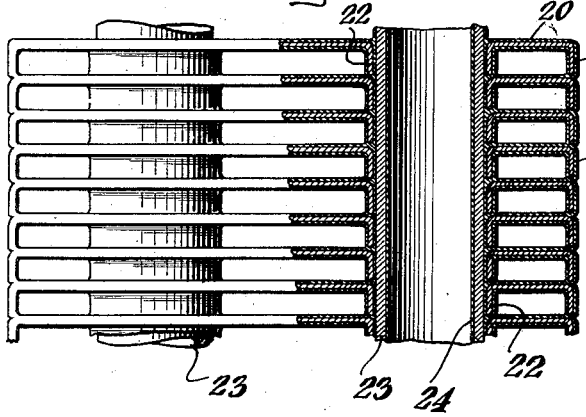
INVENTOR
William E. Oakey
BY
Hoguet & Neary
ATTORNEYS Patented July 2, 1935

2,007,001

UNITED STATES PATENT OFFICE 2,007,001

EXTENDED SURFACE CONVECTOR

William E. Oakey, Oriskany, N. Y.

Application March 2, 1934, Serial No. 713,743

4 Claims. (Cl. 257—124)

My invention relates to heating and cooling apparatus and particularly to the manufacture of convectors or heat transfer devices of the extended surface type, in which the conductor, such as a tube or tubes, through which the heating or cooling medium passes, is provided with a series of plates or fins the surfaces of which, in effect, constitute extensions of the heating surface of the conductor.

This application is in large part a division of my co-pending application Serial No. 507,559, filed January 9, 1931.

In the manufacture of such extended surface convectors, it is customary to assemble the plates or fins on the conducting tube by pressing the tube through openings formed therefor in the fins. Heretofore, the fins have normally been secured in place on the tube by expanding the tube to form friction joints, by soldering the fins to the tubes, or by spot welding. Joints of this character cannot be used satisfactorily unless the tubes and the fins are made of non-rusting metals, such as copper and bronze, as otherwise corrosion at the joints impedes the flow of heat between the tubes and the fins. Even with such metals, friction joints and soldered joints reduce the overall heat conductivity of the unit below that of the metals employed. When the fins are held on the tubes by friction, the resulting joints do not form efficient heat conducting bonds between the tubes and the fins. Solder is a poor heat conductor, and is liable to oxidation, which further impairs the effectiveness of the solder as a conducting bond between the tubes and the fins. Spot welding is more satsifactory, but is quite expensive.

According to my invention, I overcome these difficulties by providing an effective brazed bond between the conducting tube and the fins mounted thereon which serves both to increase the overall heat conductivity and therefore the effectiveness of the heating or cooling device and to form a rigid structure. At the same time, I provide the surfaces of the convector with a coating of the brazing metal which tends to protect the surfaces against corrosion. Because of the high temperature of the brazing bath, I must employ high melting materials, such as ferrous metals, for the tubes and fins, but this is an advantage because of the strength and low cost of the ferrous metals. The brazed joints and coating of my invention so enhance the heat conductivity of my units that an overall heat conductivity is obtained with ferrous metal tubes and fins approximately equalling or exceeding that obtainable with copper or bronze tubes and fins and the ordinary friction or soldered joints.

A feature of my invention resides in the provision of an effective conducting bond between a conducting tube or tubes and the plates or fins whose surfaces constitute extensions of the surfaces of the conducting tube or tubes.

A second feature resides in fixedly securing the plates or fins to the conducting tube or tubes in order to provide a strong and rigid heating or cooling unit.

A third feature resides in providing the surfaces of the heating or cooling unit with a coating which tends to protect them against rusting.

A fourth feature of my invention resides in providing the conducting bond, securing the fins to the conductors and applying the protecting and finishing coating in a single operation.

A fifth feature is the provision of brazed joints between the tubes and the headers of a convector unit, which brazed joints are less liable to leak in service than the conventional "rolled and ferrule" and "compression nut" types of joints heretofore ordinarily employed in such units.

Other features and advantages of my invention will become apparent upon consideration of the following detailed description, taken in conjunction with the accompanying drawing, in which:

Figure 1 is a plan view of a heating or cooling unit constructed in accordance with my invention;

Figure 2 is an elevation, partially in section, of a portion of the unit shown in Figure 1;

Figure 3 is a sectional elevation taken on the line 3—3 of Figure 1;

Figure 4 is a plan view, partially in section, of a portion of a modified form of a heating or cooling unit according to my invention;

Figure 5 is a plan view of a further modification adapted for heating by electricity; and Figure 6 is a perspective view of a butted tube that may be employed in the manufacture of convectors according to my invention.

Referring to Figures 1, 2 and 3, the heating or cooling unit or convector 1 comprises tubes 2 of any desired cross section, conveniently round, pressed into openings 3 provided therefor in headers 4. The tubes 2 are preferably made of steel or wrought iron, and may be either seamed, seamless or butted as desired. By butted tubes, I mean tubes manufactured from elongated sheets which are rolled or otherwise formed into tubes of the desired cross-section having a seam where the edges of the sheet meet in opposition as shown in Figure 6. The butt seam thus made will then be sealed during the brazing operation to be subsequently described.

The headers 4 may be of malleable iron or sheet or cast steel or other high fusion material. Each header 4 is formed with an interior chamber 5 communicating with the tubes 2 and is also provided with a suitable port 6 for connecting the unit in the heating or cooling system. Mounted on the tubes 2 between the headers 4 is a series of plates or fins 7, the surfaces of which, in effect, constitute extensions of the surfaces of the tubes.

Each of the fins 7, one of which is shown in elevation in Figure 3, comprises a plate, which may be of sheet steel, provided with openings 8 for the tubes 2. The fins 7, if of steel, are preferably at least 0.018 inch in thickness, in order to avoid excessive warping during the subsequent brazing operations. Bosses 10 are provided on the fins adjacent the openings 8, for example, by drawing the fin in forming the openings. The fins 7 are supported in spaced relation, as in jigs, and the tubes 2 are then pressed through the bosses 10 and openings 8 in the fins to assemble the fins in spaced relation on the tubes. The tubes 2 with the fins 7 thereon are then combined with the headers 4 by pressing the ends of the tubes into the openings 3 provided in the headers.

When the fins, tubes and headers are thus assembled into a heating or cooling unit, the unit may then be dipped as a whole into a suitable flux bath. The unit is then dipped into a molten cuprous brazing bath. Preferably a cuprous alloy such as brass is employed, but pure copper may be used if desired. Cuprous alloys such as silver solder might also be employed, but their cost is prohibitive for ordinary use. The brazing metal adheres to the exterior surfaces of the fins 7, tubes 2 and headers 4, and also to the interior surfaces of the tubes 2 and headers 4, thus affording a coating tending to protect these surfaces against rusting and the possible deteriorating action of the heating or cooling fluids.

The brazing metal also acts to braze the fins 7 to the tubes 2 and the tubes to the headers 4, the molten metal flowing into all spaces between the fins and tubes and the tubes and headers, as indicated at 16 and 17, in Figure 2. The brazing metal not only serves to braze the fins rigidly to the tubes but also forms an effective conducting bond between the tubes and fins.

When the convector is made with butted tubes, for example as illustrated in Figure 6, the brazing metal also serves to join and seal the edges of the sheets from which the tubes are formed, so that the tubes become fluid-tight conductors.

The brazed coating thus provided on the surfaces of the fins, tubes and headers forms a shell, as indicated by the irregular line 18 in Figure 2, within which the headers 4, tubes 2 and fins 7 are imbedded. The exterior surfaces of this shell form a substantially continuous surface. It will be understood that this shell is in practice very thin.

It is to be noted that by brazing the fins to the tubes and the tubes to the headers, as above described, a perfect metallic joint is formed between the fins and tubes and the tubes and headers. This metallic joint forms a better heat conducting bond than when the fins are held on the tubes by a soldered joint or by friction.

It is also to be noted that by brazing the fins to the tubes and the tubes to the headers a stronger connection is provided between these parts than may be obtained by soldering these parts to each other, since the brazing metal unites the various parts into an integral whole. As a result, the fins and other parts of the heating or cooling unit are less apt to be twisted or otherwise distorted when the unit is installed in a heating or cooling system. The fins, tubes and headers are more rigidly and permanently secured to one another by brazing than by soldered connections, since the brazing metal has a higher tensile strength than soldered connections have.

The joining of the tubes to the headers by the brazing metal also provides a fluid-tight joint between these parts, which joint is superior to a friction joint, or a soldered joint, since fatigue of the solder may result in leakage.

Inasmuch as dipping the assembled parts of the heating or cooling unit in the molten cuprous brazing bath secures the tubes, fins and headers to one another, provides an effective conducting bond between the tubes, fins and headers, and applies a rust-resisting coating to the interior and exterior surfaces of the unit, all in a single operation, the manufacturing costs of such units are appreciably reduced.

Where a ferrous metal unit constructed in accordance with my invention is to be used under conditions particularly conducive to corrosion, it may be desirable to afford additional protection by coating or plating the unit after subjecting it to the brazing operation. This, however, is not ordinarily necessary, as the brazed coating is sufficiently thick and uniform to afford a reasonable degree of protection against corrosion.

In the modification of my invention shown in Figure 4, the fins 20 are turned down at their sides to form flanges 21, which are preferably of the same length as or longer than the bosses 22. The fins are then assembled on the tubes 23 so that the flanges 21 or both the flanges and the bosses 22 as illustrated of each fin are in contact with the adjoining fin. Headers may be provided as illustrated in Figures 1 and 2. Upon then dipping the assembly in a molten brazing bath as above described, a coating 24 is formed that joins all of the parts into an integral whole and performs the other functions enumerated above. The flanges 21, either alone or with the bosses 22, thus serve to space the fins a desired distance apart, and the flanges 21, when joined together, form more or less smooth sides for the unit. It will be understood that in this figure the thickness of the brazed coating is somewhat exaggerated for the purpose of illustration.

One of the advantages of the construction shown in Figure 4 is that the flanges 21 tend to diminish warping of the fins 20 as a result of the high temperature of the brazing bath, which is necessarily around 1800° F. This warping of the fins takes place both in the constructions of Figure 1 and of Figure 4, but is less pronounced in the latter. The warping is an unavoidable result of the exposure of the thin sheet metal fins to the high brazing temperature, but in no way interferes with the use of the unit, as it is not severe enough to do more than make the air passages between the fins slightly irregular. Nor does the warping of the fins appreciably affect the appearance of the unit, particularly since it is usually mounted in an ornamental grilled enclosure.

Although I have described my invention above in connection with a convector unit having a pair of conducting tubes, it is to be understood that my invention is equally applicable to a convector having only a single conducting tube or one having more than two tubes. Moreover, for some uses of my convector it is desirable simply to braze the tubes and the fins together without first assembling the headers thereon, and to assemble headers, elbow joints or other fittings as my be desired on the tubes thereafter. Furthermore, it will be apparent to those skilled in this art that the tubes may in some cases be bent or curved instead of straight as shown, and that the fins may be corrugated or otherwise specially shaped to fit particular requirements.

The unit 30 shown in Figure 5 is constructed similarly to that shown in Figure 4, except that a tubular electric resistance heating element 31 is substituted for the tubes 2, and no headers are required. The connections 32 permit current to be supplied to the resistance element 31. The tubular resistance elements 31 are now standard market products, and are supplied encased in ferrous metal tubes which permit bending to the shape indicated. The fins 33 are brazed to the element 31 and to each other as above described, suitable precautions being taken to keep the connections 32 from contact with the brazing metal. A strong, simple and efficient electric heating unit is thus produced at low cost.

It will be apparent from the foregoing description that a heating or cooling unit constructed in accordance with the principles of my invention is efficient in operation, rigid in construction, neat in appearance and may be economically manufactured. I have described my convector generally as a heating or cooling unit, and it will be understood that it may be applied to many forms of existing equipment, among which may be mentioned air heaters for buildings, coolers for electric refrigerators, condensers and evaporators.

While my invention is described above in its preferred form, there are many changes and variations that may be made without departing from the spirit thereof, and I desire to include all such changes and variations within the scope of the appended claims.

The adjective "brazed" as used in the claims is intended to mean and include formed by brazing with a molten cuprous brazing bath as above described.

I claim:

1. An extended surface convector comprising, in combination, a ferrous metal fluid conducting tube, a plurality of ferrous sheet metal fins of small area mounted on said tube, brazed joints between said fins and said tube, and a brazed coating integral with said brazed joints and forming a substantially continuous heat conducting and protective surface over said tube and fins.

2. An extended surface convector comprising, in combination, a fluid conducting tube formed from a ferrous metal sheet and having a longitudinal butt seam, a plurality of ferrous sheet metal fins of small area mounted on said tube, brazed joints between said fins and said tube and between the edges of said butt seam, and a brazed coating integral with said brazed joints and forming a substantially continuous heat conducting surface over said tube and fins.

3. An extended surface convector comprising, in combination, a fluid conducting ferrous metal tube, a plurality of ferrous sheet metal fins of small area mounted on said tube, flanges along two opposed edges of each of said fins adapted to engage an adjoining fin, brazed joints between said fins and said tube and between said flanges and the adjoining fins, whereby the tube and the fins are joined into a unitary rigid structure with two closed sides, and a brazed coating integral with said brazed joints and forming a substantially continuous heat conducting surface over said tube and fins.

4. An extended surface convector comprising, in combination, a fluid conducting ferrous metal tube, a plurality of ferrous sheet metal fins of small area mounted on said tube, a ferrous metal header on each end of said tube, brazed joints between said fins and said tube and between said tube and said headers, and a brazed coating integral with said brazed joints and forming a substantially continuous heat conducting surface over said tube, fins and headers.

WILLIAM E. OAKEY.